Patented Jan. 2, 1923.

1,440,836

UNITED STATES PATENT OFFICE.

ERNEST A. MORGAN, OF DORCHESTER, MASSACHUSETTS.

COMMERCIAL FERTILIZER.

No Drawing. Application filed January 27, 1920, Serial No. 354,487. Renewed November 21, 1922. Serial No. 354,487.

*To all whom it may concern:*

Be it known that I, ERNEST A. MORGAN, a citizen of the United States, and resident of Dorchester, in the county of Suffolk and State of Massachusetts, have invented new and useful Improvements in Commercial Fertilizers, of which the following is a specification.

This invention relates to a composition of matter for the general uses of a commercial fertilizer.

Commercial fertilizers heretofore in use have characteristically contained moisture, phosphoric acid in soluble, reverted or insoluble form, potassium as a carbonate sulphate, or chlorate, and nitrogen-bearing elements, generally nitrates or ammoniates with more or less free chlorine. These constituents are practically provided by use of a range of more or less expensive materials familiar to those skilled in the art. The value of such fertilizers depends upon the degree to which their natural condition or the manner of their application permits absorption by growing plants of the growth elements of the plants, particularly of the phosphoric acid, the nitrogen and the potassium.

A principal object of the present invention is to provide a composition of matter which can be prepared in a dry powdered state, preferably containing not above 3% of moisture, which will be practically odorless, which will contain nitrogen, potassium and phosphoric acid or any of these substances, in due proportion, and which will contain these substances in a state, or in the presence of other materials tending to put them in a state, adapting the available chemical contents of the ingredients efficiently to be absorbed by the plant growth intended to be promoted.

I shall hereinafter describe a specific instance of such a composition of matter having high availability as a fertilizer for hay and grain crops and adapted without change as a general fertilizer for orchard, garden and farm uses, the composition containing no element deleterious to any type of crop, whether grasses or grains, tuberous, leguminous or of the annual or perennial garden types, and having therein available nutriment suitable for each type of vegetation.

By experiment and research I have discovered that ordinary ingredients of commercial fertilizers, hitherto regarded with justice as difficult to assimilate under the usual conditions of mixture with the soil or application as a top dressing, can be made to show remarkably improved results when used in the presence of an inert substance which, so far as I am aware, neither enters into the chemical structure of the plants nor combines in a chemical sense with the ingredients of the fertilizer. I do not know and therefore I am not prepared to say why such ingredient has its observed action, but I regard it as probable that the action of the added substance, in the presence of natural moisture, the natural acid or alkaline reaction of the soil, or the natural bacterial action constantly present in all planted soil, acts as a facilitator or catalytic promoting natural chemical combination, solution, or absorption which otherwise would not take place.

I shall now describe by way of example only one preferred composition, mentioning a proportion by weight of the respective ingredients given as a particular instance only of the many variable proportions of ingredients which may be prescribed for particular soils or particular crops, the preferred proportions given being such as I have found to have general utility for miscellaneous application to soils for the varied crops mentioned above.

The composition may comprise potassium-bearing ingredients, nitrogen-bearing ingredients, and ingredients containing phosphoric acid, or any of these, depending upon the needs of the crop. These ingredients, in a ground and dry state, are mixed with a substantial proportion of finely-divided sulphur. While as mentioned above, I am unable wholly to explain the behavior of the sulphur in association with the remaining ingredients, I have established by exhaustive experiment an extraordinary benefit from its inclusion with the other ingredients, which I ascribe to the facilitation by the mere presence of the finely-divided sulphur of chemical or bacterial combination, impregnation or solution in the soil and absorption of the remaining ingredients by the growing plants. The effect of the finely-divided sulphur whether as a catalytic or as a stage-constituent of chemical products formed during the reaction between the weathering soil, the fertilizing solids, and the growing plants, I have repeatedly demonstrated is greatly to increase the vigour and rate of growth of plants of all sorts as compared with the increase ascribable to the remaining ingredients used without the sulphur.

The sulphur-treated soil is not a hospitable breeding place for many of the detrimental forms of life, such as certain fungus spores, and I am aware of the occasional use of sulphur in agriculture as an insecticide and destroyer of such forms of life. I am not aware, however, that the action of sulphur as a facilitator of plant nutriment when employed in the presence of appropriate nutritive or fertilizing agents has heretofore been observed or utilized.

I prefer that the potassium-bearing ingredients shall contain different forms of potassium-containing substances, such as hard-wood ashes and commercial crude potassium carbonate, capable of being assimilated at different rates or after different lapses of time in the soil. I also prefer that the nitrogen-content should be distributed among different ingredients, for a similar purpose, as between commercial sodium nitrate and ground bone, and that in addition to the bone, the phosphate content shall also include a commercial acid phosphate. These provisions are beneficial in distributing the release of nutriment to the plant through a longer part of the growing season than would be the case were only one form of each of the potassium, nitrogen or phosphatic ingredients used alone, the more readily assimilable form of the ingredient being available for early use by the plants, and the less readily assimilable form being available after exhaustion of the more readily assimilated form.

A typical formula recommended for general application is as follows:

| | | |
|---|---|---|
| 600 pounds of | Canadian hard-wood ashes; |
| 200 " " | commercial crude potassium carbonate; |
| 200 " " | powdered sulphur; |
| 400 " " | sodium nitrate; |
| 300 " " | ground bone; |
| 300 " " | acid phosphate. |

These materials are reduced by grinding or otherwise to a fine state, intimately mixed, and spread in the desired quantity on the soil to be fertilized, or planted by the seed drill along with the seed, or otherwise used in any known way of applying a fertilizing agent.

In some cases when the fertilizer is desired in less concentrated form, I may mix the material intimately with from one-half to five times its weight of a dried substance such as sifted soil or loam, ground wood or bark, fine sawdust, the dried fibrous residue of leached manures, or the vat sediments of sewage reduction processes. When dried substances of this nature in substantial proportions are mixed with the remaining ingredients, selective separation of the different ingredients out of the mixture is prevented or retarded by the mechanical action of the extending or diluting material. This is particularly useful when the fertilizer is spread or scattered in assisting to carry a properly-proportioned mixture to the soil.

I claim:—

1. A commercial fertilizer containing in a mixed and finely divided state a soluble potassium salt, soluble nitrate of soda, and a soluble phosphate and also containing about a tenth part by weight of said ingredients of powdered sulphur.

2. A commercial fertilizer comprising about forty per centum of a potassium-bearing ingredient, about twenty per centum of sodium nitrate, about fifteen per centum of acid phosphate, about fifteen per centum of ground bone, and about ten per centum of powdered sulphur.

3. A commercial fertilizer containing in a mixed and finely divided state soluble potash, soluble sodium nitrate, and a soluble phosphate and also containing about a tenth part by weight of said ingredients of powdered sulphur, in intimate mixture with a predetermined proportion of an extending or diluting dried substance.

Signed by me at Boston, Massachusetts, this twenty-second day of January 1920.

ERNEST A. MORGAN.